(12) United States Patent
Korotaev et al.

(10) Patent No.: US 10,826,805 B2
(45) Date of Patent: Nov. 3, 2020

(54) SYSTEM AND METHOD FOR DYNAMIC ONLINE BACKUP OPTIMIZATION

(71) Applicant: Acronis International GmbH, Schaffhausen (CH)

(72) Inventors: Kirill Korotaev, Moscow (RU); Mark Shmulevich, Moscow (RU); Stanislav Protasov, Moscow (RU); Serguei M. Beloussov, Costa del Sol (SG)

(73) Assignee: Acronis International GmbH, Schaffhausen (CH)

(*) Notice: Subject to any disclaimer, the term of this patent is extended or adjusted under 35 U.S.C. 154(b) by 168 days.

(21) Appl. No.: 15/644,902

(22) Filed: Jul. 10, 2017

(65) Prior Publication Data

US 2018/0013644 A1    Jan. 11, 2018

Related U.S. Application Data

(60) Provisional application No. 62/360,681, filed on Jul. 11, 2016.

(51) Int. Cl.
*H04L 12/26* (2006.01)
*H04L 29/08* (2006.01)
(Continued)

(52) U.S. Cl.
CPC .............. *H04L 43/08* (2013.01); *H04L 67/10* (2013.01); *H04L 67/141* (2013.01); *H04L 67/28* (2013.01);
(Continued)

(58) Field of Classification Search
CPC . H04L 43/08; H04L 43/0894; H04L 43/0852; H04L 67/10; H04L 67/141; H04L 67/28; H04L 47/24; H04L 47/82; H04L 67/42; H04L 47/12; H04L 29/06537; H04L 29/08144; H04L 29/08153; H04L 29/08171; H04L 29/08189;
(Continued)

(56) References Cited

U.S. PATENT DOCUMENTS

6,064,647 A * 5/2000 Van Krevelen ......... H04L 45/00
  340/2.26
6,603,769 B1 * 8/2003 Thubert .................. H04L 45/04
  370/389
(Continued)

*Primary Examiner* — Michael Won
(74) *Attorney, Agent, or Firm* — Arent Fox LLP; Michael Fainberg (57) ABSTRACT

Methods of optimizing transmission of data from a client to a remote data center are disclosed, as well as systems and computer program products related to the same. An exemplary method comprises: receiving data, at a first intervening data center, transmitted from a client and addressed to a terminal data center, wherein the first intervening data center and the terminal data center are selected from a plurality of connected data centers; and transferring the data, from the first intervening data center through one or more additional intervening data centers selected from the plurality of connected data centers, until the data reaches the terminal data center; wherein each data center in the plurality of data centers independently selects a connected data center to transfer the data to based upon the amount of latency and/or bandwidth available at the connected data center.

11 Claims, 7 Drawing Sheets

(51) Int. Cl.
*H04L 29/06* (2006.01)
*H04L 12/911* (2013.01)
*H04L 12/851* (2013.01)

(52) U.S. Cl.
CPC .......... *H04L 67/42* (2013.01); *H04L 43/0852* (2013.01); *H04L 43/0894* (2013.01); *H04L 47/24* (2013.01); *H04L 47/82* (2013.01)

(58) Field of Classification Search
CPC ......... H04L 29/08369; H04L 29/08549; H04L 29/08828; H04L 29/08945; H04L 45/125; H04L 45/24; H04L 45/245; H04L 5/00; H04L 5/0001; H04L 69/24; H04L 67/1002; H04L 67/1004; H04L 67/1008; H04L 67/1012; H04L 67/1055; H04L 67/1097; H04L 67/2857; H04L 67/32; H04L 29/12009; H04L 45/00; H04L 45/02; H04L 45/44; H04L 49/25; H04L 2012/6443; H04L 43/1852
See application file for complete search history.

(56) References Cited

U.S. PATENT DOCUMENTS

| | | | | |
|---|---|---|---|---|
| 6,614,765 B1* | 9/2003 | Bruno | | H04L 45/00 |
| | | | | 370/255 |
| 7,814,226 B2* | 10/2010 | Patrick | | H04L 41/145 |
| | | | | 370/351 |
| 8,112,471 B2* | 2/2012 | Wei | | H04L 67/1008 |
| | | | | 709/202 |
| 9,680,919 B2* | 6/2017 | McDaid | | H04L 67/10 |
| 10,411,967 B2* | 9/2019 | Krishnaswamy | | H04L 41/145 |
| 2002/0165944 A1* | 11/2002 | Wisner | | G06F 11/2035 |
| | | | | 709/220 |
| 2003/0084388 A1* | 5/2003 | Williamson, Jr. | | |
| | | | | G01R 31/31921 |
| | | | | 714/725 |
| 2004/0156495 A1* | 8/2004 | Chava | | H04L 45/00 |
| | | | | 379/392 |
| 2004/0184483 A1* | 9/2004 | Okamura | | H04L 47/10 |
| | | | | 370/477 |
| 2005/0086363 A1* | 4/2005 | Ji | | H04L 45/00 |
| | | | | 709/235 |
| 2007/0005801 A1* | 1/2007 | Kumar | | H04L 63/08 |
| | | | | 709/238 |
| 2010/0097931 A1* | 4/2010 | Mustafa | | H04L 43/026 |
| | | | | 370/235 |
| 2010/0150161 A1* | 6/2010 | Saksena | | H04L 45/124 |
| | | | | 370/400 |
| 2011/0055426 A1* | 3/2011 | Lakshmanan | | G06F 9/5066 |
| | | | | 709/242 |
| 2013/0111038 A1* | 5/2013 | Girard | | H04L 45/245 |
| | | | | 709/226 |
| 2016/0080501 A1* | 3/2016 | Freimuth | | H04L 63/04 |
| | | | | 709/228 |
| 2016/0192029 A1* | 6/2016 | Bergstrom | | H04L 43/0882 |
| | | | | 725/109 |
| 2017/0093811 A1* | 3/2017 | Dolev | | H04L 45/1287 |
| 2017/0201585 A1* | 7/2017 | Doraiswamy | | H04L 41/0806 |
| 2018/0013644 A1* | 1/2018 | Korotaev | | H04L 67/28 |
| 2018/0152545 A1* | 5/2018 | Steiner | | H04L 67/1002 |
| 2019/0104035 A1* | 4/2019 | Cidon | | H04L 41/046 |
| 2019/0104111 A1* | 4/2019 | Cidon | | H04L 12/4641 |
| 2019/0104413 A1* | 4/2019 | Cidon | | H04W 12/08 |
| 2019/0158605 A1* | 5/2019 | Markuze | | H04L 12/4625 |

* cited by examiner

SYSTEM AND METHOD FOR DYNAMIC ONLINE BACKUP OPTIMIZATION

CROSS REFERENCE TO RELATED APPLICATION

This patent application claims priority to U.S. Provisional Patent Application No. 62/360,681, filed on Jul. 11, 2016, the contents of which is hereby incorporated by reference in its entirety.

TECHNICAL FIELD

The disclosure is generally directed to the technical field of data archiving and backup. In several general aspects, the disclosure provides methods, systems, and computer software products for optimizing the transmission of user or enterprise data to one or more remote data centers.

BACKGROUND

Data archiving is a concern for both the enterprise and individual computer users. Modern industries are becoming increasingly reliant on electronic information and digital assets. Indeed, many companies have publicly acknowledged that proprietary data as their most valuable corporate asset. Similarly, the amount of personal data and digital content used and stored by individual computer users continues to grow.

In the past, the storage needs of individuals and enterprises were generally met by local storage options (e.g., local backup drives, writable storage media such as DVDs, etc.). Local external drives, for example, provide a cost effective solution for many computer users. Corporate users with particularly large archives have also turned to offsite storage (e.g., storing archival data on magnetic tape archives and redundant backup drives). More recently, the increased availability of broadband and wireless internet access has led to many users switching to internet-based storage options, with file storage sites becoming popular among individuals and enterprises alike.

However, even though Internet access is ubiquitous for most modern users and devices, current methods for remote file storage suffer from several major limitations that substantially reduce their usefulness, especially for enterprises and users that require a system capable of handling large volumes of data efficiently. For example, current remote storage platforms typically route data from a client to a remote data center using the geographically shortest route without considering routes that are geographically distant but preferable for data transmission. Similarly, as data is routed from a client to a remote server it often must pass through intermediate networks owned and managed by third parties. Third party network owners often impose traffic restrictions (e.g., restricting traffic by allocating bandwidth based on the type of traffic or the ports used for a transmission). It is also common for network owners to set bandwidth limits for each data session to prevent individual users from using the full capacity of an intervening network connection, even when the resource is fully available. These restraints can create artificial bottlenecks, reducing the efficiency of current remote backup solutions. Moreover, current methods are also poorly suited to handle users that regularly connect to a remote data center while traveling to geographically distant regions (e.g., corporate executives). Known methods and systems will often simply connect a client directly to the remote server instead of locating a better transmission route.

As such, there is a general need in the art for improved methods of routing data between a client and a remote data center, particularly in the field of data archiving.

SUMMARY

The present disclosure provides systems, methods and computer program products for optimizing transmission of data from a client to a terminal data center. In selected aspects, these systems, methods and computer program products reduce or solve the above-identified limitation associated with methods known in the art. In one exemplary aspect, a method according to the disclosure includes: receiving data, at a first intervening data center, transmitted from a client and addressed to a terminal data center, wherein the first intervening data center and the terminal data center are selected from a plurality of connected data centers; and transferring the data, from the first intervening data center through one or more additional intervening data centers selected from the plurality of connected data centers, until the data reaches the terminal data center; wherein each data center in the plurality of data centers is connected to at least one other data center in the plurality of data centers and configured to monitor an amount of latency and/or a bandwidth available at the connected data center; and wherein each data center in the plurality of data centers independently selects a connected data center to transfer the data to based upon the amount of latency and/or the bandwidth available at the connected data center.

In another exemplary aspect, each data center in the plurality of data centers is configured to: monitor the amount of latency and/or bandwidth available at the one or more data centers to which it is connected in real-time; and/or monitor the amount of latency and/or bandwidth available at the one or more data centers to which it is directly connected.

In another exemplary aspect, each data center in the plurality of data centers independently selects a connected data center to transfer the data to based upon the connected data center having at least one: the lowest latency of any connected data center; the highest available bandwidth of any connected data center; a combination of the amount of latency and/or bandwidth available at the connected data center; and a latency and/or bandwidth level that exceeds a preselected threshold for one or both parameters.

The present disclosure provides systems, methods and computer program products for optimizing transmission of data from a client to a terminal data center. In one exemplary aspect, a method according to the disclosure includes: partitioning data comprising a file or data stream on the client into a plurality of segments; establishing a plurality of parallel network connections between the client and at least one intervening data center, each connection configured to transmit an independent data stream; transferring the plurality of segments to the terminal data center, through the at the least one intervening data center, wherein each segment is transmitted in parallel as an independent data stream; and recombining the transferred segments, at the terminal data center, to generate the original file or data stream partitioned by the client.

In another exemplary aspect, the client and/or at least one of the intervening data centers is configured to determine and select an optimal route to the terminal data center, and to direct the transfer of the plurality of segments to the terminal data center through the selected route.

In another exemplary aspect, the optimal route is determined based upon at least one of the following: the latency level at one or more of the intervening data centers; the bandwidth available at one or more of the intervening data centers; a combination of the amount of latency and/or bandwidth available at one or more of the intervening data centers; a preference selected by a user; a default provided by the client or by one of the intervening data centers; or geographic proximity.

The present disclosure provides systems, methods and computer program products for optimizing transmission of data from a client to a remote data center. In one exemplary aspect, a method according to the disclosure includes: establishing, by the client, a network connection between the client and a proxy server configured to route data received from the client to a terminal data center; and transmitting the data from the client to the proxy server, wherein the proxy server is configured to dynamically determine and select an optimal route to the terminal data center through one or more intervening data centers; and transmitting the data from the proxy server to the terminal data center using the selected optimal route through the one or more intervening data centers.

In another exemplary aspect, the proxy server is a transparent proxy.

In another exemplary aspect, the terminal data center is: selected by a user; or provided by the client.

In an alternative aspect, the proxy server is configured to determine an optimal route based upon geographic proximity of the one or more intervening data centers.

In another exemplary aspect, the optimal route is determined based latency and/or bandwidth available at one or more of the intervening data centers.

In another exemplary aspect, the data is transmitted from the proxy server to the terminal data center in real-time.

In another exemplary aspect, transmission of the data from the proxy server to the terminal data center is deferred.

In another exemplary aspect, the method further includes at least one of the following: the data transmitted from the client to the proxy server is partitioned into a plurality of segments which are then transmitted as parallel data streams; the data transmitted from the proxy server to the terminal data center is partitioned into a plurality of segments which are then transmitted as parallel data streams to at least one intervening data center; and the data transmitted from the at least one intervening data center to the terminal data center is partitioned into a plurality of segments which are then transmitted as parallel data streams.

In another exemplary aspect, the proxy server dynamically determines the optimal route to the terminal data center by monitoring bandwidth and/or latency levels at the one or more intervening data centers.

In another exemplary aspect, the one or more intervening data centers are each configured to report bandwidth and/or latency levels to the proxy server in real-time or at a predetermined interval.

In another exemplary aspect, the data transmitted from the proxy server to the at least one intervening data center further comprises the route determined and selected by the proxy server.

In another exemplary aspect, at least one of the intervening data centers is configured to dynamically determine and select an alternative route to the terminal data center and to transmit the data to the terminal data center directly or through one or more additional intervening data centers based upon the alternative route.

In another exemplary aspect of the disclosure, a system for optimizing transmission of data from a client to a remote data center is disclosed, the system including a processor configured to perform the steps of any of the methods disclosed herein.

In an additional aspect of the disclosure, a computer program product embedded in a non-transitory computer-readable storage medium is disclosed, the computer-readable storage medium comprising computer-executable instructions for optimizing transmission of data from a client to a terminal data center, the medium including instructions for performing the steps of any of the methods disclosed herein.

This simplified summary of exemplary aspects of the disclosure serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more exemplary aspects of the present disclosure and together with the detailed description, serve to explain their principles and implementations.

DETAILED DESCRIPTION

Exemplary aspects of the disclosure are described herein in the context of a system, method and computer program product for optimizing transmission of data from a client to a remote data center. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the exemplary aspects as illustrated in the accompanying, drawings. The same reference indicators will be used to the extent possible throughout the drawings and the following description to refer to the same or like items.

As described herein, methods and systems are disclosed for optimizing transmission of data from a client to a remote data center. As will be appreciated herein, these methods and systems provide efficient mechanisms for transmitting data from a client to a remote data center which overcome limitations of methods and systems known in the art, such as bottlenecks causes by data session bandwidth limitations and inefficient routing of data from the client to a remote data center. When referring to remote data centers in the present disclosure, the term "terminal data center" is used to distinguish the endpoint for a data transmission to or from a client, from one or more "intervening data centers" which receive and relay the data between the client and the terminal data center. In other instances, the term "remote data center" may be used to refer to non-local data centers generally. The term "client" refers to software running and/or installed on a user's or enterprise computer system or electronic device, which is configured to transmit data to a terminal data center using one of the optimized transmission methods disclosed herein.

As noted above, individuals and enterprises are collecting and using more electronic data now that at any time before. As such, there is a need for efficient methods and systems for transmitting, archiving, syncing and otherwise storing this data. Users and enterprises may rely on local storage (e.g., external hard drives) to store data. However, given the ubiquitous nature of internet access for most modern users, it is preferable to utilize remote storage (e.g., at a remote data center). By storing data remotely, users and enterprises may enable efficient access to the archived data by multiple users at various locations. A key issue related to remote storage is the ability to efficiently transmit data between a client and the remote data center where the data will be archived, or from which data is being received. Efficient data transmission is a particular concern for users and/or enterprises that have substantial amounts of data to transfer or which utilize applications that require quick response times for file transfer operations. Notwithstanding the widespread availability of internet access, serious technical issue exist which hinder the deployment and use of remote storage.

For example, a user seeking to connect and transmit data to a terminal data center will likely need to transmit the data through an intervening network of intervening data centers in order for the data to reach the terminal data center. Current methods and systems typically route traffic from a source to a destination by simply following the geographically shortest route between the endpoints. This is non-ideal, as a geographically more distant route may have superior bandwidth and reduced latency compared to a geographically shorter route, resulting in an inefficient transmission of data.

Similarly, the user may be part of an enterprise that controls the intervening network and data centers (e.g., a private network). However, in many cases the data will need to travel through one or more intervening networks and data centers that are publicly-owned or owned by third parties. Unfortunately, third party network and data center owners typically enforce bandwidth restrictions on traffic passing through these resources. For example, it is common for network and data centers to apply a bandwidth limit on individual data sessions, or to reduce bandwidth on specific ports or for specific types of traffic. Even if the channel capacity is 1 GB/s and it is completely free at the current moment, the provider may set a bandwidth limit of 5 or 10 MB/s for third party traffic (e.g., the data transmission from the client to the terminal data center). As such, intervening data centers may act as a bottleneck, reducing the speed of data transmitted from a client to a terminal data center.

Related to the issues above, transmission of data to a terminal data center may be particularly inefficient for individuals that regularly travel to different geographic locations (e.g., corporate executives). Such users may have a need to regularly connect to one or more pre-selected terminal data centers, such a main corporate data center or regional corporate data centers. The user may, for example, wish to access, archive or sync data while traveling. However, current methods and clients typically operate by attempting to establish a direct connection with a remote data center rather than attempting to more efficiently route the data through a set of intervening data centers that can transmit the data to and from the terminal data center at a faster rate.

In contrast, the inventors named in the present disclosure have surprisingly found that the above-identified limitations can be reduced, or removed entirely, by optimizing transmission of data from a client to a terminal data center. In select aspects, optimization may be performed by monitoring the bandwidth and/or latency at one or more intervening data centers and dynamically routing the transmitted data along a path that minimize one or both of these parameters. In alternative aspects, optimization may be performed by splitting the data into multiple parallel data streams in order to avoid potential bandwidth bottlenecks imposed by third party data centers. In a third general aspect, optimization may entail the use of a proxy server (e.g., a transparent proxy) in order to efficiently route data from a client to a terminal data center. In still further aspects, methods and systems may combine and/or implement any of the features associated with these three general methods in order to generate customized optimization solutions.

Figure 1:
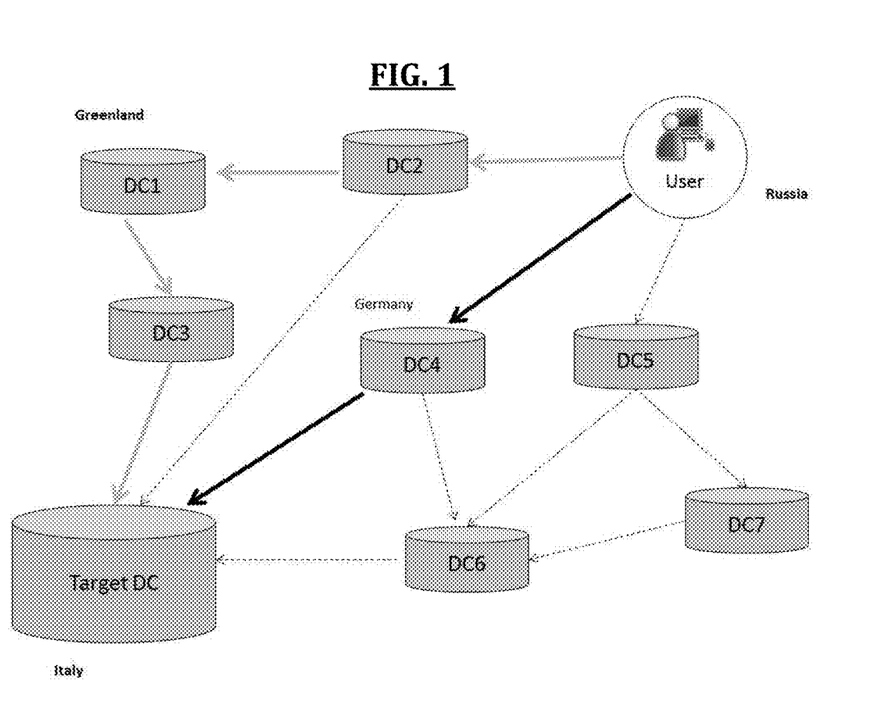
FIG. 1 illustrates a network diagram of a method or system for optimizing transmission of data from a client to a remote data center according to an exemplary aspect.

FIG. 1 is a network diagram illustrating an exemplary method according to the present disclosure. As shown by this diagram, a user located a first location (e.g., Russia) may wish to transmit data to or from a terminal data center located at a geographically distant location (e.g., Italy). Multiple pathways through various intervening data centers (abbreviated as "DC1," "DC2," "DC3," etc.) may be possible. These intervening data centers may be quite distant from each other (e.g., DC1 in Greenland and DC4 in Germany). The user, located in Russia, may establish a connection with the terminal data center and transmit data to or from this terminal data center using a client operating on a user's (or enterprise) computer or device. In many cases, the specific route used to transmit the data is unimportant as acceptable transmission speeds may be available through most of the possible routes.

However, a user may have need for a particularly fast transmission speed (e.g., because of a need to transfer a sizable amount of data or due to an application on the user's computer system that requires rapid data transmission). An optimized transmission of data may be achieved by routing the data to the terminal data center through one or more intervening data centers selected based upon their having high bandwidth and/or low latency.

In order for this system to function, at a minimum at least one of the intervening data centers must be configured to determine the bandwidth and/or latency available at the data center. This may be accomplished by monitoring traffic entering/exiting the intervening data center. Ideally, a plurality (if not all) of the intervening data centers should possess this functionality, so that bandwidth and/or latency can be measured throughout the network of data centers. In select aspects, bandwidth and/or latency is determined constantly in real-time, at preselected intervals, based upon a script executed at the intervening data center, and/or in response to a request generated by a client or another intervening data center. The bandwidth and/or latency may be determined using hardware or software.

In select aspects, one or more of the intervening data centers reports the monitored levels of bandwidth and/or latency to the client or to at least one other intervening data center. The report may also include the levels of bandwidth and/or latency at other intervening data centers. For example, in select aspects a list of reported bandwidth and/or latency levels may be generated at an intervening data center and then successively expanded as the list is propagated through the network to other intervening data centers and/or to the client).

Having established a network comprising a plurality of data centers, with at least one (and preferable all) of the data centers monitoring bandwidth and/or latency, data transmission from a client to or from a terminal data center selected from the plurality of data centers may be optimized by dynamically changing the route of the data transmission based upon the bandwidth and/or latency levels at the intervening data centers. In select aspects, a client may connect to a first intervening data center selected based upon: geographic proximity, user choice, a level of bandwidth and/or latency reported by the first intervening data center to the client, or any other criteria. Data addressed to a terminal data center may then be transmitted to the first intervening data center.

Upon receiving the data and determining the address of the terminal data center to which it is directed, the first intervening data center may then relay the data directly to the terminal data center or to one or more other intervening data centers. Selection of the next step in the route may be based upon the bandwidth and/or latency at one or more directly or indirectly connected intervening data centers. In select aspects, the first data center may evaluate multiple routes to the terminal data center based upon the bandwidth and/or latency at the one or more intervening data centers between the first data center and the terminal data center (e.g., by calculating and comparing the transmission time for each potential route). In some instances, it may be determined that the data should be routed to another intervening data center despite the first data center having a direct connection to the terminal data center (e.g., where the other intervening center has a direct connection to the terminal data center that is higher in bandwidth). Once a determination is made as to the next step in the route, the first data center may relay the data sent by the client to the next intervening data center (or to the terminal data center). In select aspects, transmission of the data from the first data center to a selected intervening data center may include additional information, such as routing information (e.g., a pre-calculated optimal route) or other data.

The process described above in the preceding paragraph may then repeat at each intervening data center as the data is relayed through the network to the terminal data center. At each step, the current intervening data center may determine a new optimal path or to follow a pre-selected path provided with the data by a prior intervening data center or by the client. In this manner, the data is efficiently routed from the client to the terminal data center along an optimal path.

In select aspects, methods according to this general aspect may utilize some or all features disclosed herein as part of an alternative aspect (e.g., the use of parallel data streams disclosed in the context of the second general aspect, and/or the real-time and deferred modes disclosed in the context of the third general aspect).

Figure 2:
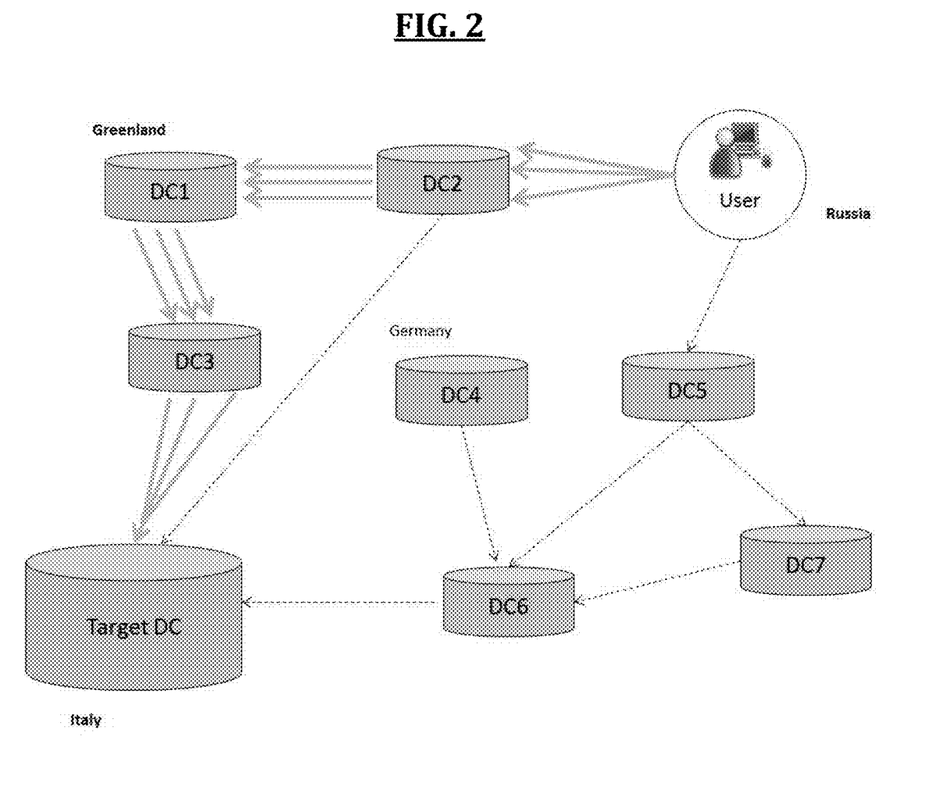
FIG. 2 illustrates a network diagram of a method or system for optimizing transmission of data from a client to a remote data center according to a further exemplary aspect.

FIG. 2 is a network diagram illustrating an alternative exemplary method according to the present disclosure. As shown by this diagram, the transmission of data from a client to a terminal data center may be optimized by implementing parallel data streams. In accordance with this general method, the initial data (e.g., a file or data stream) on a user's computer or device may be split into a plurality of segments, which are then transmitted to the first intervening data center as a plurality of parallel data streams, wherein each data stream comprises an independent data session. As noted above, it is not uncommon for data center and/or network owners to implement bandwidth limits that restrict the amount of bandwidth available to individual data sessions, in order to prevent a single user from monopolizing or overly burdening the network or data center. However, splitting the user's data into parallel data streams comprising independent data sessions may allow a client to transmit data to an intervening data center while circumventing such restrictions. As such, methods according to this general aspect may provide faster transmission than traditional methods wherein data is transmitted as a single data stream. Upon arrival at the terminal data center, the parallel data streams may be recombined to generate the initial data (e.g., the file or data stream) sent by the client.

Upon receipt of the parallel data streams at a first intervening data center, or any subsequent intervening data centers, the parallel data streams may be recombined to generate the original data that was sent by the client. Alternatively, the parallel data streams may be relayed to one or more additional intervening data centers (or directly to the terminal data center) without being recombined until arrival at the terminal data center.

In select aspects, the parallel data streams are received at an intervening data center and recombined in order to generate a copy of the data sent by the user, which may then be optionally stored at the intervening data center as an archival copy, and the data may then be once again split again into parallel data streams and transmitted onward to the next intervening data center or to the terminal data center, as the case may be, as described above.

In select aspects, the parallel data streams are received by an intervening data center and buffered prior to being relayed to the next intervening data center (or to the terminal data center). For example, an intervening data center may wait until all parallel data streams related to a particular transmission have arrived before beginning the next transmission to a subsequent intervening data center or to the terminal data center.

In some aspects, one or more of the plurality of data streams may comprise address information for the terminal data center. In select aspects, the data streams may be encrypted. In still further aspects, one or more of the intervening data centers may be configured to monitor bandwidth and/or latency band to direct the parallel data streams based upon these levels.

Upon receiving the parallel data streams, an intervening may select the next destination (i.e., a subsequent data center or the terminal data center) based upon any criteria disclosed herein, including parameters discussed above in the context of the first general aspect of the disclosure. For example, the destination may be selected based upon bandwidth and/or latency levels, by the user, based upon a preference list in the client, etc.

In select aspects, methods according to this general aspect may utilize some or all features disclosed herein as part of an alternative aspect (e.g., the dynamic routing disclosed in the context of the first general aspect, and/or the real-time and deferred modes disclosed in the context of the third general aspect).

Figure 3:
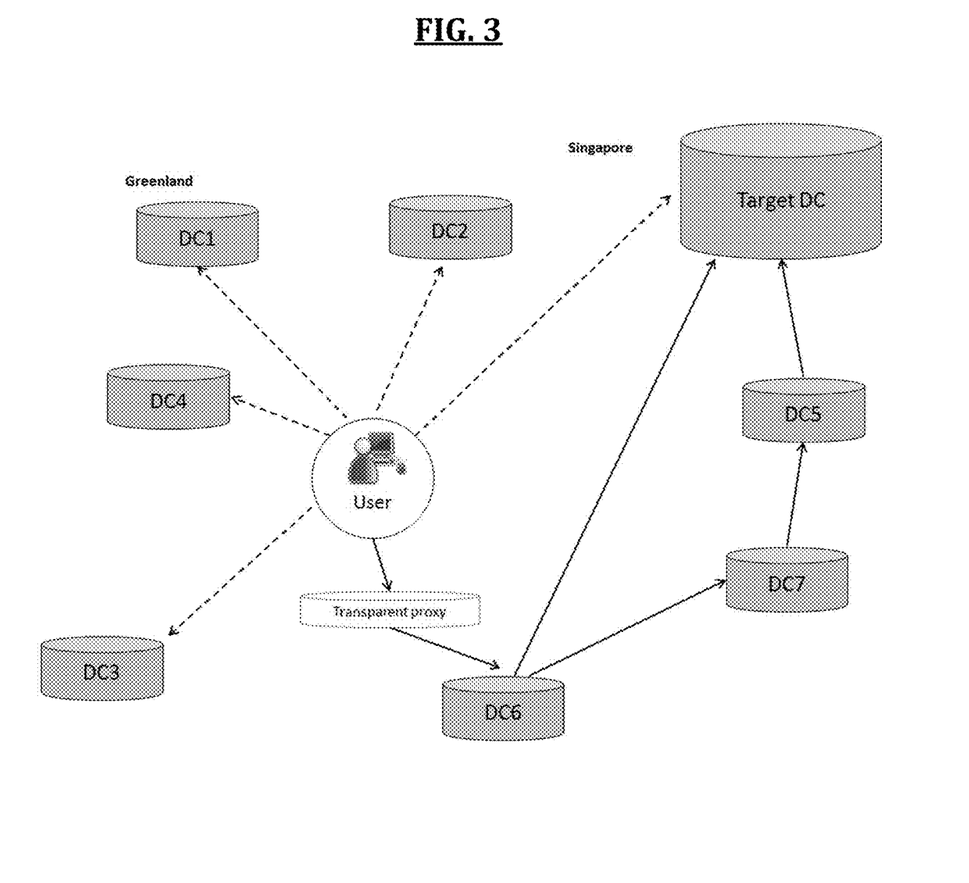
FIG. 3 illustrates a network diagram of a method or system for optimizing transmission of data from a client to a remote data center according to a further exemplary aspect.

FIG. 3 is a network diagram illustrating an alternative exemplary method according to the present disclosure. As shown by this diagram, the transmission of data from a client to a terminal data center may be optimized by use of a proxy server (e.g., a transparent proxy). Users that travel often may experience issues transmitting data to and from a regularly selected terminal server, particularly users that often travel to geographically distant areas (e.g., corporate managers and executives). For example, an executive may travel abroad to several countries on business and periodically connect to a main corporate server at home in order to periodically backup files on the executive's laptop. Because of the regular nature of this connection, the address of the terminal data center (in this example, the main corporate server) may be pre-selected as a destination for a backup program on the laptop. Methods and systems known in the art will typically attempt a direct connection or an otherwise non-optimize connection to the terminal data center. Moreover, data transmission is often faster between data centers; as a result, a route based on several intervening data centers may very well be faster than a direct connection.

However, in methods according to this aspect a client on a user's computer or device may be configured to redirect data transmissions intended for the terminal data center to a proxy server instead, so that the proxy server may then in turn dynamically determine where to send the data in order to optimize the transmission. In many instances, this will be the geographically closest intervening data center. However, the proxy server may use any of the methods and parameters disclosed herein to select an intervening data center (e.g. bandwidth and/or latency). Moreover, the proxy server may transmit the data to the selected intervening data center via parallel data streams, as discussed above in relation to the second general aspect of the disclosure.

Once the data is received at the first intervening data center, it may then be relayed through one or more additional intervening data centers or transmitted directly to the terminal data center. The determination as where the data should be sent may be based on any of the methods and parameters disclosed herein to select an intervening data center (e.g. bandwidth and/or latency).

The process described above in the preceding paragraph may then repeat at each intervening data center as the data is relayed through the network to the terminal data center. At each step, the current intervening data center may determine a new optimal path or to follow a pre-selected path provided with the data by a prior intervening data center or by the client. In this manner, the data is efficiently routed from the client to the terminal data center along an optimal path.

In select aspects, data is transmitted from the user to the terminal data center in real-time, i.e., data received at an intervening data center is immediately relayed to the terminal data center (or a subsequent intervening data center) without waiting for receipt of the transmission at the initial intervening data center to be complete.

In other aspects, data is transmitted from the user to the terminal data center in a deferred mode, i.e., data is not relayed from an intervening data center to the terminal data center (or a subsequent intervening data center) following receipt of a transmission until transmission at the initial intervening data center is complete.

In select aspects, methods according to this general aspect may utilize some or all features disclosed herein as part of an alternative aspect (e.g., the dynamic routing disclosed in the context of the first general aspect, and/or the use of parallel data streams disclosed in the context of the second general aspect).

Figure 4:
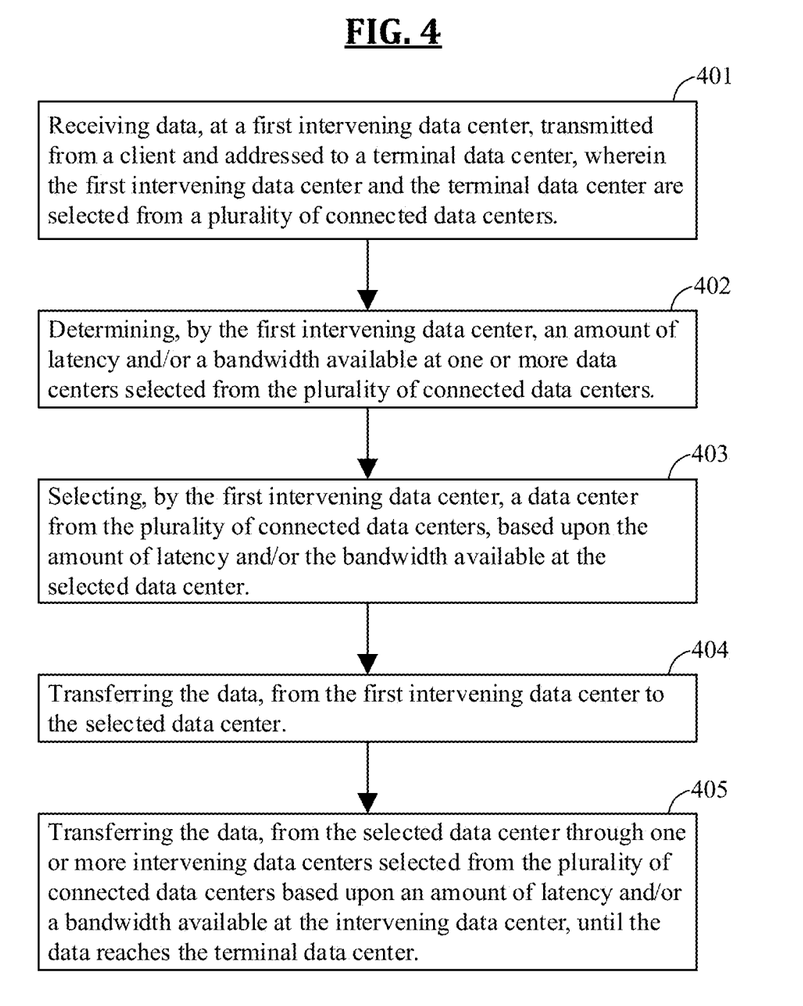
FIG. 4 is a flowchart illustrating a method according to an exemplary aspect of the disclosure.

FIG. 4 is a block diagram illustrating a method according to an exemplary aspect of the disclosure. In particular, this figure discloses a method of optimizing transmission of data from a client to a terminal data center through one or more intervening data centers. The method begins by receiving data, at a first data center, transmitted from a client and addressed to a terminal data center, wherein the first data center and the terminal data center are selected from a plurality of connected data centers (401). The first data center determines an amount of latency and/or a bandwidth available at one or more intervening data centers selected from the plurality of connected data centers (402), selects an intervening data center from the plurality of connected data centers, based upon the amount of latency and/or the bandwidth available at the selected data center (403), and transfers the data to the selected intervening data center (404). The data is subsequently transferred from the selected intervening data center through one or more additional intervening data centers until the data reaches the terminal data center, wherein each intervening data center is selected based upon an amount of latency and/or a bandwidth available at the intervening data center (405).

The method illustrated by this exemplary aspect provides an optimized process for routing data from a client, data center, or other origination point to a remote destination by selecting an efficient route at each branch point between the origin and destination (e.g., based upon the connection properties of the next transfer point). In some exemplary aspects, the first and/or intervening data centers may be configured to monitor connection properties (e.g., bandwidth or latency) at connected data centers in real-time. In some exemplary aspects, an intervening data center may be selected based upon any combination of latency and bandwidth parameters and may take into account a threshold or average value of either or both parameters.

Figure 5:
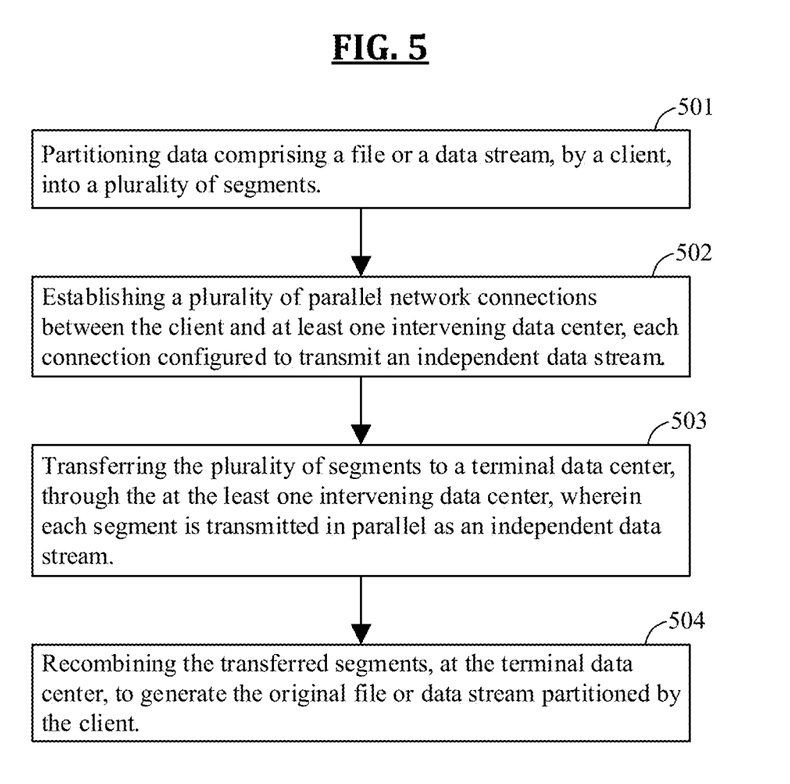
FIG. 5 is a flowchart illustrating a method according to another exemplary aspect of the disclosure.

FIG. 5 is a block diagram illustrating a method according to an exemplary aspect of the disclosure. In particular, this method provides a method of optimizing transmission of data from a client to a terminal data center. The method begins by partitioning data comprising a file or a data stream, by a client, into a plurality of segments (501). A plurality of parallel network connections are established between the client and at least one intervening data center, each connection configured to transmit an independent data stream (502). Next, the plurality of segments is transferred to a terminal data center, through the at the least one intervening data center, wherein each segment is transmitted in parallel as an independent data stream (503). Finally, the transferred segments are recombined at the terminal data center, to generate the original file or data stream partitioned by the client (504). This exemplary method provides an efficient data routing protocol which is useful for transferring large volumes of data and/or exploiting available bandwidth provided by multiple network connections. In some exemplary aspects, a method for optimizing transmission of data from a client to a terminal data center (or between any two points, generally) may combine aspects of the exemplary methods disclosed in FIGS. 4 and 5. For example, a method according to the exemplary aspect provided in FIG. 4 may be modified to also partition the data being transferred between data centers into a plurality of segments and to establish a plurality of network connections to perform the transmission using multiple independent data streams. Increased efficiency may thus be achieved by leveraging aspects of both of these methods.

Figure 6:
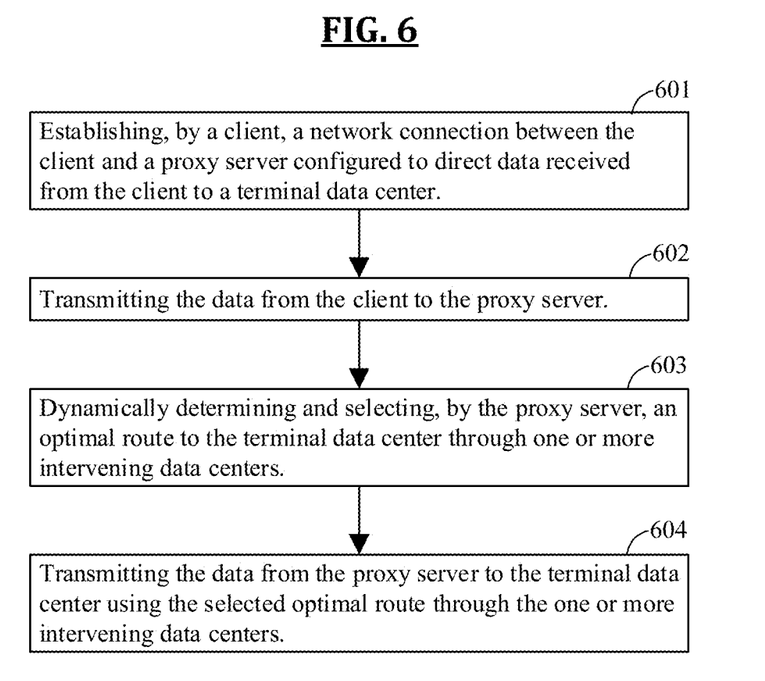
FIG. 6 is a flowchart illustrating a method according to another exemplary aspect of the disclosure.

FIG. 6 is a block diagram illustrating a method according to an exemplary aspect of the disclosure. In particular, this figure discloses a method of optimizing transmission of data from a client to a terminal data center. The method begins by establishing, by a client, a network connection between the client and a proxy server configured to direct data received from the client to a terminal data center (601), and Transmitting the data from the client to the proxy server (602). The proxy server then dynamically determines and selects an optimal route to the terminal data center through one or more intervening data centers (603) and transmits the data from the proxy server to the terminal data center using the selected optimal route through the one or more intervening data centers (604). The method according to this exemplary aspect utilizes a proxy server to determine an optimal route for the traffic. the optimal route may be determined by any network parameter or variable disclosed herein (geographic proximity, available bandwidth or latency at the intervening data center, etc.). As noted above, additional methods based on this exemplary aspect combined with features disclosed in the exemplary aspects of FIGS. 4 and/or 5 are also contemplated. For example, in such methods the data transmitted from the proxy server to the terminal data center may be partitioned into a plurality of segments which are then transmitted as parallel data streams to at least one intervening data center in order to further increase the efficiency of the overall transfer process.

Figure 7:
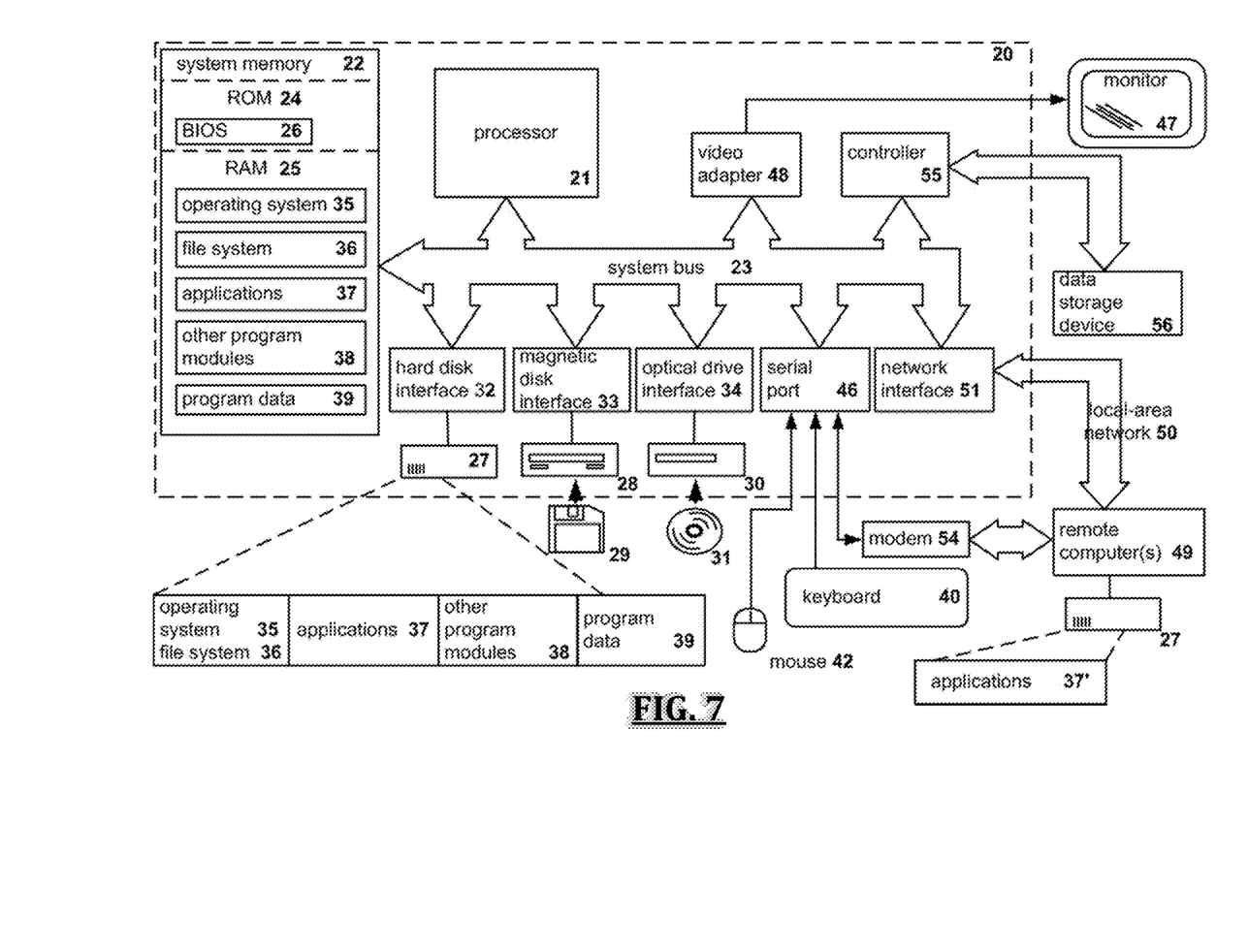
FIG. 7 illustrates an example of a general-purpose computer system on which the disclosed systems and method can be implemented.

FIG. 7 illustrates an example of a general-purpose computer system (which may be a personal computer or a server) on which the disclosed systems and methods can be implemented according to an exemplary aspect. It should be appreciated that the detailed general-purpose computer system can correspond to the computer system described above.

As shown in FIG. 7, the computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 4. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method of transmitting data for backup from a client device to a remote terminal data center via one or more intervening data centers, the method comprising:
   receiving, at an intervening data center, one or more data streams of the backup data;
   recombining the received data streams into an archival copy of the backup data;
   storing the archival copy of the backup data at the current intervening data center;
   obtaining network parameters of the terminal data center and one or more other intervening data centers located between the current intervening data center and the terminal data center, the network parameters including at least one of bandwidth restrictions and network latencies;
   calculating, based on the network parameters, a transmission time of the backup data via a direct route from the current intervening data center to the terminal data center;
   calculating, based on the network parameters, transmission times of the backup data via one or more different indirect routes from the current intervening data center to the terminal data center via one or more of the other intervening data centers;
   determining, from all calculated transmission times, the fastest direct or indirect route for transmitting the backup data from the current intervening data center to the terminal data center;
   determining a bandwidth restriction that a next data center associated with the fastest direct or indirect route imposes for an individual data session on a network of the next data center, wherein the bandwidth restriction is less than an available bandwidth at the next data center;
   re-splitting the backup data into a plurality of data streams based on the bandwidth restriction;
   transmitting each of the plurality of data streams in a plurality of independent data sessions to next data center; and
   repeating the above steps at the next data center if it is not the terminal data center.

2. The method of claim 1, wherein the current intervening data center is a transparent proxy.

3. The method of claim 1, wherein the terminal data center is: selected by a user; or provided by the client device.

4. The method of claim 1, wherein the next data center is not a closest data center of the one or more different indirect routes based on geographic proximity to the current intervening data center.

5. The method of claim 1, wherein the plurality of data streams is transmitted from the current intervening data center to the next data center in real-time.

6. The method of claim 1, wherein intervening data centers are each configured to report at least one of bandwidth and latency levels to a proxy server in real-time or at a predetermined interval.

7. A system of transmitting data for backup from a client device to a remote terminal data center via one or more intervening data centers, the system comprising:
   a network interface configured to receive and transmit data; and
   a hardware processor communicatively coupled to the network interface, wherein the hardware processor is configured to:
   receive, at an intervening data center, one or more data streams of the backup data;
   recombine the received data streams into an archival copy of the backup data;
   store the archival copy of the backup data at the current intervening data center;
   obtain network parameters of the terminal data center and one or more other intervening data centers located between the current intervening data center and the terminal data center, the network parameters including at least one of bandwidth restrictions and network latencies;
   calculate, based on the network parameters, a transmission time of the backup data via a direct route from the current intervening data center to the terminal data center;
   calculate, based on the network parameters, transmission times of the backup data via one or more different indirect routes from the current intervening data center to the terminal data center via one or more of the other intervening data centers;
   determine, from all calculated transmission times, the fastest direct or indirect route for transmitting the backup data from the current intervening data center to the terminal data center;
   determine a bandwidth restriction that a next data center associated with the fastest direct or indirect route imposes for an individual data session on a network of the next data center, wherein the bandwidth restriction is less than an available bandwidth at the next data center;
   re-split the backup data into a plurality of data streams based on the bandwidth restriction;
   transmit each of the plurality of data streams in a plurality of independent data sessions to next data center; and
   repeat the above steps at the next data center if it is not the terminal data center.

8. The system of claim 7, wherein the current intervening data center is a transparent proxy, and
   wherein the terminal data center is at least one of selected by a user and provided by the client device.

9. The system of claim 7, wherein the next data center is not a closest data center of the one or more different indirect routes based on geographic proximity to the current intervening data center.

10. The system of claim 7, wherein the plurality of data streams is transmitted from the current intervening data center to the next data center in real-time.

11. A non-transitory computer readable medium comprising computer executable instructions for transmitting data for backup from a client device to a remote terminal data center via one or more intervening data centers, including instructions for:

receiving, at an intervening data center, one or more data streams of the backup data;

recombining the received data streams into an archival copy of the backup data;

storing the archival copy of the backup data at the current intervening data center;

obtaining network parameters of the terminal data center and one or more other intervening data centers located between the current intervening data center and the terminal data center, the network parameters including at least one of bandwidth restrictions and network latencies;

calculating, based on the network parameters, a transmission time of the backup data via a direct route from the current intervening data center to the terminal data center;

calculating, based on the network parameters, transmission times of the backup data via one or more different indirect routes from the current intervening data center to the terminal data center via one or more of the other intervening data centers;

determining, from all calculated transmission times, the fastest direct or indirect route for transmitting the backup data from the current intervening data center to the terminal data center;

determining a bandwidth restriction that a next data center associated with the fastest direct or indirect route imposes for an individual data session on a network of the next data center, wherein the bandwidth restriction is less than an available bandwidth at the next data center;

re-splitting the backup data into a plurality of data streams based on the bandwidth restriction;

transmitting each of the plurality of data streams in a plurality of independent data sessions to next data center; and repeating the above steps at the next data center if it is not the terminal data center.

\* \* \* \* \*